Patented Aug. 4, 1931

1,817,686

UNITED STATES PATENT OFFICE

MAX HARTMANN, OF BASEL, SWITZERLAND, ASSIGNOR TO THE FIRM SOCIETY OF CHEMICAL INDUSTRY IN BASLE, OF BASEL, SWITZERLAND

PROCESS FOR THE MANUFACTURE OF PHYSIOLOGICALLY ACTIVE SUBSTANCES FROM FEMALE INTERNAL SECRETORY SEX ORGANS

No Drawing. Application filed November 28, 1925, Serial No. 72,038, and in Switzerland December 5, 1924.

The invention relates to the manufacture of purified physiologically active substances from female internal secretory sex organs by saponification.

Extracts of female internal secretory sex organs which are made by the process described in the United States patent specification 1,314,321 and by other processes, contain considerable proportions of fatty acids and other acid substances, the separation of which is difficult because the treatment with aqueous alkalies of such extracts or their solutions in organic solvents immiscible with water produces emulsions which are almost inseparable.

I have found that purified extracts of physiologically active substances may be obtained by saponification from female internal secretory organs by treating an impure extract of said organs containing fatty acids in an organic solvent with a solid adsorbent impregnated with an inorganic alkaline compound to saponify the fatty acids, evaporating off the said organic solvent and extracting the mixture with a similar organic solvent to remove the physiologically active substances.

In this process charcoal, kieselguhr, or some other material which is highly adsorptive may be used as a solid adsorbent and, as an inorganic alkaline compound for instance sodium hydroxide, calcium hydroxide, sodium- or potassium-carbonate, or the like, may be used.

As organic solvents there always must be chosen such solvents as will dissolve the physiologically active substances but not the inorganic alkaline compound or the soaps which have been formed. Thus alcohol, ether, petroleum ether, benzene or acetone may be used as solvent for the saponification with an earth alkali hydroxide or an alkali carbonate, while alcohol must be avoided for the saponification with an alkali hydroxide, for alkali hydroxides are soluble in alcohols.

In this manner the saponification of the extracts is attained in the simplest manner that at the same time further impurities, such as coloring matters, are removed.

Instead of an impure extract of a female internal secretory sex organ one may take for saponification the finely powdered organ itself and mix it with the adsorbent, thus combining extraction with purification.

Alkaline earth soaps may be produced by double decomposition of alkali soaps with alkaline earth halides in the selected solvent.

This purifying operation may be introduced at any desired phase of the known extraction and purification processes. For example, when the process of the specification 1,314,321 is adopted the aforesaid method of purification may be applied before or after the distillation in a vacuum, or at any other stage of the process.

The following examples illustrate the invention, the parts being by weight:—

Example 1

10 parts of animal charcoal are impregnated with 1 part of caustic soda in aqueous alcohol solution and the aqueous alcohol evaporated. The alkaline charcoal powder is triturated, with addition of a little ether, with an ether solution of two parts of previously purified placenta extract. After evaporating the ether, the mass is completely extracted with acetone at the ordinary temperature and the acetone then distilled from the extract thus obtained. There is thus isolated a clear oil which may be subjected to further purification, or used directly.

Example 2

10 parts of charcoal are stirred with two parts of milk of lime. The paste thus produced is dried in a vacuum until it contains only a little water. It is then stirred with an ethereal solution of 2 parts of an ovary extract for some hours. In this operation the calcareous powder withdraws from the solution the fatty acids and other impurities, effecting simultaneously a decolorization and an adsorption of lime soaps. The etheral solution, which has become clear, is evaporated after filtration and the residue is re-dissolved in alcohol for complete separation of small residues of lime soap and the solution again evaporated. There is thus obtained a bright oil easily soluble in the usual organic solvents and in fatty oils.

Example 3

10 parts of powdered corpora lutea are mixed with 5 parts of charcoal previously impregnated with some caustic soda solution, and the mixture is extracted with acetone. There is thus obtained a brght extract which may be purified further in known manner.

What I claim is:

1. A process for purifying by saponification physiologically active substances from female internal secretory sex organs comprising treating an impure extract of said organs containing fatty acids with a solid adsorbent of the class of charcoal and kieselguhr impregnated with an inorganic alkaline compound to saponify the fatty acids, said treatment taking place in such an organic solvent wherein the alkaline compound and the soaps formed are insoluble, evaporating off said organic solvent and extracting with a neutral aliphatic organic solvent, which will remove the physiologically active substances without dissolving the soaps or the alkaline compound.

2. A process for purifying by saponification physiologically active substances from female internal secretory sex organs comprising treating an impure extract of said organs containing fatty acids in an organic solvent with a solid adsorbent of the class of charcoal and kieselguhr impregnated with an inorganic alkaline compound to saponify the fatty acids, evaporating off said organic solvent and extracting with acetone which will remove the physiologically active substances of said extract without dissolving the saponification products or the alkaline compound.

In witness whereof I have hereunto signed my name this 14th day of November, 1925.

MAX HARTMANN.